United States Patent [19]

Conway et al.

[11] 3,873,470

[45] Mar. 25, 1975

[54] METHOD OF MANUFACTURING A HYDRODESULFURIZATION CATALYST

[75] Inventors: John E. Conway, La Grange; Robin J. Parker, Western Springs, both of Ill.

[73] Assignee: Universal Oil Products Company, Des Plaines, Ill.

[22] Filed: May 7, 1973

[21] Appl. No.: 358,257

Related U.S. Application Data

[63] Continuation-in-part of Ser. No. 105,699, Jan. 11, 1971, abandoned.

[52] U.S. Cl............ 252/465, 252/463, 252/466 PT, 252/466 J, 208/216, 252/470
[51] Int. Cl......................... B01j 11/08, B01j 11/22
[58] Field of Search... 252/463, 465, 466 PT, 466 J, 252/470; 208/216

[56] References Cited
UNITED STATES PATENTS

| | | | |
|---|---|---|---|
| 3,116,234 | 12/1963 | Douwes et al. | 208/216 X |
| 3,206,391 | 9/1965 | Gutberlet et al. | 208/110 |
| 3,340,180 | 9/1967 | Beuther et al. | 208/108 |
| 3,519,573 | 7/1970 | Coe | 252/470 X |

*Primary Examiner*—Patrick P. Garvin
*Assistant Examiner*—W. J. Shine
*Attorney, Agent, or Firm*—James R. Hoatson, Jr.; Robert W. Welch; William H. Page, II

[57] ABSTRACT

An improved hydrodesulfurization catalyst characterized by the method of manufacture. The improvement is attributed to certain novel oxidizing procedures. Residual fuel oils are desulfurized in contact with the catalyst which comprises a Group VIB and Group VIII metal component preferably on an alumina support.

5 Claims, No Drawings

METHOD OF MANUFACTURING A HYDRODESULFURIZATION CATALYST

RELATED APPLICATION

This application is a continuation-in-part of a copending application Ser. No. 105,699, filed Jan. 11, 1971 now abandoned.

It has become well known that oxides of sulfur, plus lesser amounts of other sulfurous compounds, are among the major pollutants of the atmosphere. It has been estimated that, in this country alone, in excess of about 23 million tons of sulfur dioxide has been discharged into the atmosphere on an annual basis. The increasingly deleterious effect of the sulfurous pollutants with respect to cardiorespiratory disease, eye irritation, and the like, has prompted rather severe legislative action to control the amount of sulfur dioxide discharged into the atmosphere, particularly in densely populated areas where the problem is more acute. It has been recognized that the combustion of petroleum products accounts for a substantial portion of said oxides of sulfur and legislation has been effected or proposed which is particularly directed to the limitation of sulfurous compounds in residual fuel oils to be burned in densely populated areas. The supply of residual fuel oils of suitable low sulfur content is entirely inadequate to meet present day requirements and it becomes increasingly important to develop improved desulfurization techniques to treat the more accessible and abundant residual fuel oils of relatively high sulfur content. Desulfurization technology is presently concerned with hydrotreating and to the development of catalysts which are more selective and/or operate at less severe conditions to obviate hydrocracking of the residual fuel oil.

Hydrotreating, or hydrodesulfurization, is generally effected at hydrodesulfurization reaction conditions including an imposed hydrogen pressure of from about 100 to about 5,000 pounds per square inch (psi). Normally, the hydrogen is charged together with recycle hydrogen to provide from about 1,000 to about 5,000 standard cubic feet per barrel (scf/bbl.) of hydrocarbon charge. Hydrodesulfurization reaction conditions further include an elevated temperature, usually from about 200° to about 950° F. although temperature in the higher range, say from about 600° to about 950° F., are most suitable. Also, the sulfur-containing feed stock is generally suitably processed at a liquid hourly space velocity (LHSV) of from about 0.2 to about 20. Hydrodesulfurization catalysts preferably comprise a Group VIB metal and a Group VIII metal on a refractory inorganic oxide carrier material, usually alumina or a composite of alumina and silica.

It is generally recognized that catalysis involves a mechanism particularly noted for its unpredictability. Minor variations in a method of manufacture often result in a substantially improved catalyst product. The improvement may result from a minor alteration in the physical character and/or composition of the catalyst product to yield a novel composition difficult of definition and apparent only as a result of substantially improved activity, selectivity and/or stability realized with respect to one or more conversion reactions. For example, it has been discovered that the aforementioned hydrodesulfurization catalyst, modified in the course of manufacture as a consequence of certain novel calcining procedures, exhibits a substantial improvement, particularly with respect to activity.

It is then an object of the present invention to present an improved process for the hydrodesulfurization of residual fuel oils. It is a more specific object to present an improved catalyst characterized by a method of preparation and particularly adapted to the dehydrosulfurization of residual fuel oils.

In one of its broad aspects, the present invention relates to the preparation of a catalyst composite which comprises impregnating a preformed refractory inorganic oxide carrier material with a thermally decomposable metal compound precursor of a catalytically active metallic component, heating the impregnated carrier material to within less than about 100°F. of the decomposition temperature of said metal compound in an atmosphere comprising at least about 20% steam, and thereafter substituting substantially all of said steam with air and calcining the impregnated carrier material at a temperature of from about 800° to about 1,200° F. in a substantially dry oxidizing atmosphere.

Other objects and embodiments of this invention will become apparent in the following detailed specification.

The description "residual fuel oil" is intended to include the residuum produced by separating light fractions from crude petroleum, also known as asphaltum oil, liquid asphalt, black oil, petroleum tailings, residuum, residual reduced crude, and bunker fuel oil, typically having a distillation range in excess of about 650° F.

The refractory inorganic oxide carrier materials employed herein include alumina, silica, zirconia, thoria, boria, and the like, as well as combinations thereof such as alumina-silica, alumina-zirconia, etc. The refractory inorganic oxide, while utilized as a carrier or support for the catalytic components of the catalytic composite, is also selected for its contribution to the overall activity, selectivity and/or stability of the catalyst composite. Thus, alumina is a preferred carrier material.

The carrier material is a preformed refractory inorganic oxide conforming to the desired size and shape of the catalyst product. Thus, the refractory inorganic oxide is formed into particles of desired size and shape, for example, by commingling a powdered form of the selected carrier material with a binder or lubricant and compressing the mixture into pellets of uniform size and shape. Alternatively, the mixture can be prepared as an extrudable mass and pressured through orifices of predetermined size, the extrudate being subsequently broken or cut to desired lengths. Suitable binders or lubricating agents include starch, polyvinyl alcohol, methylcellulose, graphite, etc.

The catalyst composite herein contemplated is particularly effective as a hydrodesulfurization catalyst when utilizing a carrier material characterized by a surface area of from about 140 to about 270 m²/gm, an average pore volume of from about 0.3 to about 0.7 cc/gms, and an average pore diameter of from about 60 to about 120 Angstroms. The described physical properties of the final catalyst product are largely determined by the physical characteristics of the carrier material initially employed. One preferred method of preparing the carrier material which affords a convenient means of developing the desired physical characteristics relates to the gelation of an alumina sol to form spherical gel particles utilizing the well-known oil-drop method. Thus, an alumina sol, suitably prepared by digesting aluminum pellets in aqueous hydrochloric acid, is dispersed as droplets in a hot oil bath whereby gelation occurs. In this type of operation, the alumina is set chemically utilizing ammonia as a neutralizing or setting agent. Usually the ammonia is furnished by an ammonia precursor which is included in the sol. The ammonia precursor is suitably urea, hexamethylenetetramine, or mixtures thereof, although other weakly basic materials which are substantially stable at normal temperatures but hydrolyzable to ammonia with increasing temperature may be employed. Only a fraction of the ammonia precursor is hydrolyzed or decomposed in the relatively short period during which initial gelation occurs. During the subsequent aging process, the residual ammonia precursor retained in the spheroidal gel particles continues to hydrolyze and effect further polymerization of the gel particles whereby the pore characteristics of the composite are established. The spheroidal gel particles are aged, usually for a period of from about 10 to about 24 hours at a predetermined temperature, usually from about 50° to about 220° F., and at a predetermined pH value. The aging time is substantially reduced utilizing pressure aging techniques.

As previously stated, the foregoing method affords a convenient means of developing the desired physical characteristics of the catalyst composite. The method includes a number of process variables which effect the spheroidal gel product. Generally, the aluminum chloride ratio of the alumina sol will influence the average bulk density of the spheroidal gel product and, correspondingly, the pore volume and pore diameter characteristics attendant therewith, lower ratios tending toward higher average bulk densitites. Other process variables effecting the physical properties of the catalyst support include the time, temperature and pH at which the particles are aged. Usually, temperatures in the lower range and shorter aging periods tend toward higher bulk densities. Surface area properties are normally a function of calcination temperature, a temperature of from about 800° to about 1,500° F. being suitably employed.

It is the usual practice to deposit catalytically active metallic components on a support or carrier material by the method whereby a soluble compound of the desired metallic component is impregnated on the carrier material from an aqueous solution. The soluble compound serves as a precursor of the metallic component such that upon subsequent heating of the impregnated carrier material at a temperature effecting decomposition of said compound, the desired metallic component is formed deposited on the carrier material.

The hydrodesulfurization process herein contemplated is preferably effected in contact with a catalyst containing a metallic component comprising a metal of Group VIB and a metallic component comprising a metal of Group VIII. Thus, the catalyst composite may comprise chromium, molybdenum and/or tungsten in combination with one or more metals of Group VIII, i.e., iron, nickel, cobalt, platinum, palladium, ruthenium, rhodium, osmium and iridium. The aqueous impregnating solution will thus comprise a soluble precursor compound of a Group VIB metal. Suitable compounds include ammonium molybdate, ammonium paramolybdate, molybdic acid, ammonium chromate, ammonium peroxychromate, chromium acetate, chromous chloride, chromium nitrate, ammonium metetungstate, tungstic acid, etc. The impregnating solution is suitably a common solution of a Group VIB metal compound and a Group VIII metal compound. Suitable soluble precursor compounds of Group VIII metal include nickel nitrate, nickel sulfate, nickel chloride, nickel bromide, nickel fluoride, nickel iodide, nickel acetate, nickel formate, cobaltous nitrate, cobaltous sulfate, cobaltous fluoride, ferric fluoride, ferric bromide, ferric nitrate, ferric sulfate, ferric formate, ferric acetate, platinum chloride, chloroplatinic acid, chloropalladic acid, palladium chloride, etc. Of the Group VIB metals, molybdenum is preferred. The Group VIB metal is suitably employed in an amount to comprise from about 5 to about 20 wt. % of the final catalyst composite. The Group VIII metal, which is preferably cobalt, is effective in amounts comprising from about 0.1 to about 10 wt. % of the final catalyst composite.

Impregnation of the carrier material is accomplished by conventional impregnating techniques whereby the carrier material is soaked, dipped, suspended, or otherwise immersed in the impregnating solution at conditions to adsorb the catalytic components thereon. The impregnation is preferably effected over a relatively short period using a minimum volume of impregnating solution commensurate with an even distribution of the catalytic components on the carrier material. One preferred method involves the use of a steam-jacketed rotary dryer. The carrier material is immersed in the impregnating solution contained in the dryer and the carrier material tumbled therein by the rotating motion of the dryer. Evaporation of the solution in contact with the carrier is expedited by the application of steam to the dryer jacket. The evaporation is further facilitated by a continuous purge of the dryer utilizing a flow of dry gas, suitably air or nitrogen.

The impregnated carrier material is typically calcined at an elevated temperature effecting decomposition of the precursor compound adsorbed thereon. In accordance with the present invention, the impregnated carrier material is first heated to within less than about 100° F. of the decomposition temperature of the metal compound impregnated thereon. For example, in a preferred embodiment of this invention, wherein the carrier material is impregnated with ammonium molybdate and cobalt nitrate, the impregnated carrier material is heated to a temperature in the range of from about 500° to about 700° F. The heating is effected preferably in a steam atmosphere to the substantial exclusion of air, but in any case in an atmosphere comprising at least 20% steam or, correspondingly, in an atmosphere comprising less than about 80% air, with continued improvement being observed in the catalyst product as the amount of air is reduced and the heating atmosphere approaches 100% steam. The impregnated carrier material is preferably heated at said temperature within less than about 100° F. of the decomposition temperature of the metal compound or compound impregnated thereon for a period of from about 0.5 to about 2 hours. Pursuant to this invention, air is thereafter substituted for substantially all of the steam and the impregnated carrier material calcined and oxidized at a temperature of from about 800° to about 1,200° F. Air may be substituted for substantially all of the steam in the course of the calcining process provided that the impregnated carrier material is finally calcined in a substantially dry atmosphere at said temperature for a period of from about 1 to about 4 hours.

The hydrorefining process, utilizing the catalyst prepared in accordance with the method of the present invention, is effected by reacting a heavy hydrocarbonaceous oil and hydrogen in contact with said catalyst. The charge stock-hydrogen mixture is heated to an operating temperature within the range of from about 435° to about 930° F., and contacts the catalyst under an imposed pressure of from about 500 to about 5,000 psig. The total reaction zone product effluent is passed into a suitable high pressure, low temperature separator from which a gaseous phase rich in hydrogen is removed and recycled to combine with fresh hydrocarbon charge. The remaining normally liquid product effluent is then introduced into a suitable fractionator or stripping column for the purpose of removing hydrogen sulfide and light hydrocarbons including methane, ethane and propane. Although the normally gaseous phase from the high pressure separator may be treated for the purpose of removing the ammonia formed as a result of the destructive removal of nitrogenous compounds, a more conveient method involves the introduction of water upstream from the high pressure separator, and removing said water and adsorbed ammonia via suitable liquid level control means disposed in said pressure separator.

The following examples are presented in illustration of the present invention and are not intended as an undue limitation on the generally broad scope of the invention as set out in the appended claims.

EXAMPLE I

A spherical alumina carrier material approximately 1/16 inch in diameter was prepared in accordance with the described oil-drop method. Thus, an aluminum chloride hydrosol, formed by digesting aluminum in dilute hydrochloric acid, was commingled with hexamethylenetetramine and dispersed as droplets in a hot oil bath. The resulting spheres were aged overnight in the oil bath and then washed, dried and calcined in a dual zone oven for one hour at about 850° F. and two hours at about 1,000° F. The spheroidal carrier material had a surface area of about 220 m²/gm and an average pore volume of about 0.65 cc/gms. The alumina carrier material was thereafter impregnated with 2 wt. % cobalt and 12 wt. % molybdenum from an impregnating solution of ammonium molybdate and cobalt nitrate hexahydrate dissolved in 12 wt. % aqueous ammonium hydroxide. Impregnation was effected by immersing the alumina spheres in the impregnating solution in a steam-jacketed rotary dryer. The spheres were tumbled in the solution for about 10 minutes at room temperature after which steam was applied to the dryer jacket whereby the solution was evaporated to dryness in contact with the carrier material over a period of about 2½ hours. The impregnated spheres exhibited a loss on ingition (LOI) at 500° C. of about 30 wt. %.

The dried spheres were thereafter passed through a dual zone elongated oven by means of a continuously moving belt conveyor, the first zone being maintained at about 650° F. and the second zone at about 1,100° F. The spheres were heated in the first zone in contact with air containing about 50% steam, and transported through said zone at a rate to establish an average residence time therein of about 1 hour. The spheres were conveyed into the second zone initially in contact with air admixed with about 10% residual steam from the first zone, with substantially all of said steam being replaced by dry air introduced thereto to achieve a substantially dry atmosphere. Thus, while the spheres were initially calcined and oxidized in the second zone in an air atmosphere containing about 10% steam, the final calcination and oxidation was effected in a substantially dry atmosphere. The spheres were continuously processed through the second zone at a rate to establish an average residence time therein of about 2 hours, at least one of which was in the substantially dry air atmosphere. The spheroidal catalyst product had a surface area of about 177 m²/gms and an average pore volume of 0.43 cc/gms.

EXAMPLE II

The catalyst thus prepared, as well as the catalyst hereinafter described, was evaluated with respect to the conversion of sulfur contained in a residual crude oil. The residual crude oil charge stock contained 3.73 wt. % sulfur in addition to 8.84 wt. % heptane-insoluble asphaltenes and had an API of 12.8 at 60° F. About 100 cc of the catalyst was dispersed in intermittant fixed beds of 25 cc each. The charge stock was charged downflow through the catalyst beds in a once-through type of operation at a liquid hourly space velocity of about 1.0 and in admixture with recycle hydrogen. The hydrogen was recycled to the vertical tubular reactor at a rate of approximately 5,000 scf/bbl of hydrocarbon charge. The charge stock was preheated, entering the catalyst bed at about 695° F. and at a hydrogen pressure of about 2,000 psig. The catalyst peak temperature was 745° F. The reactor effluent was recovered in a high pressure separator, excess hydrogen being separated overhead, water-scrubbed and recycled to the reactor. The liquid product was recovered from the separator, charged to a stripper, and the stripper product recovered. After 36 hours on steam, the liquid product analyzed 0.98 wt. % sulfur, as opposed to 3.73 wt. % sulfur in the charge stock, and had an API of 21.3 at 60° F.

EXAMPLE III

A spheroidal catalyst was prepared substantially as described with the exception that the catalyst was heated in the first zone as well as the second zone of the oxidizing oven in contact with substantially dry air. When the catalyst was evaluated in accordance with the method of Example II, the liquid product analyzed 1.35 wt. % sulfur.

Again, a spheroidal catalyst was prepared substantially as described except that the catalyst was heated in the first zone of the oxidizing oven in contact with a flow of air containing about 20% steam. When the catalyst was evaluated in accordance with the method of Example II, the liquid product analyzed 1.2 wt. % sulfur.

It is thus apparent that the method of catalyst oxidation herein described provides an improved desulfurization catalyst, with continued improvement being observed as the steam content of the initial oxidizing atmosphere is increased, or correspondingly, as the air content is decreased.

We claim as our invention:

1. A method of catalyst preparation which comprises impregnating a preformed refractory inorganic oxide carrier material with an admixture of thermally decomposable salt or acid containing a metal of Group VIB and a thermally decomposable salt or acid containing a metal of Group VIII, initially heating the impregnating carrier material to within less than about 100° F. of the decomposition temperature of said metal compound in an atmosphere comprising at least about 20% steam, and thereafter substituting substantially all of said steam with air and calcining the impregnated carrier material at a temperature of from about 800° to about 1,200° F. in a substantially dry oxidizing atmosphere.

2. The method of claim 1 further characterized in that said preformed refractory inorganic oxide carrier material is alumina having a surface area of from about 140 to about 270 square meters per gram, an average pore volume of from about 0.3 to about 0.7 cubic centimeters per gram and an average pore diameter of from about 60 to about 120 Angstroms.

3. The method of claim 1 further characterized in that said Group VIB compound is ammonium molybdate and said Group VII compound is cobalt nitrate.

4. The method of claim 3 further characterized in that said impregnated carrier material is initially heated in the atmosphere comprising at least about 20% steam to a temperature of from about 500° to about 700° F.

5. The method of claim 1 further characterized in that said impregnated carrier material is heated to within about 100° F. of said decomposition temperature in an atmosphere comprising at least about 50% steam.

* * * * *